United States Patent

Ohtomo et al.

(10) Patent No.: US 9,897,436 B2
(45) Date of Patent: Feb. 20, 2018

(54) MEASURING INSTRUMENT AND SURVEYING SYSTEM

(71) Applicant: TOPCON Corporation, Tokyo-to (JP)

(72) Inventors: Fumio Ohtomo, Saitama (JP); Kaoru Kumagai, Tokyo-to (JP); Tetsuji Anai, Tokyo-to (JP)

(73) Assignee: TOPCON Corporation, Tokyo-to (JP)

( * ) Notice: Subject to any disclaimer, the term of this patent is extended or adjusted under 35 U.S.C. 154(b) by 0 days.

(21) Appl. No.: 15/602,228

(22) Filed: May 23, 2017

(65) Prior Publication Data

US 2017/0350692 A1 Dec. 7, 2017

(30) Foreign Application Priority Data

Jun. 1, 2016 (JP) .................. 2016-110129

(51) Int. Cl.
| | |
|---|---|
| *G01B 11/24* | (2006.01) |
| *G01C 3/00* | (2006.01) |
| *H04N 7/18* | (2006.01) |
| *G06T 11/60* | (2006.01) |
| *G06T 7/20* | (2017.01) |

(52) U.S. Cl.
CPC ............. *G01B 11/24* (2013.01); *G01C 3/00* (2013.01); *G06T 7/20* (2013.01); *G06T 11/60* (2013.01); *H04N 7/183* (2013.01)

(58) Field of Classification Search
CPC .. G01B 11/24; G01C 3/00; G06T 7/20; G06T 11/60

USPC .......................................................... 356/601
See application file for complete search history.

(56) References Cited

U.S. PATENT DOCUMENTS

| | | | |
|---|---|---|---|
| 2007/0167154 A1 | 7/2007 | Ohtomo et al. | |
| 2015/0331159 A1* | 11/2015 | Bridges ............... | G01C 15/004 |
| | | | 359/515 |
| 2016/0238385 A1* | 8/2016 | Ohtomo ................... | G01C 1/04 |
| 2016/0238708 A1 | 8/2016 | Ohtomo et al. | |
| 2017/0059696 A1 | 3/2017 | Ohtomo et al. | |
| 2017/0059709 A1 | 3/2017 | Ohtomo et al. | |

FOREIGN PATENT DOCUMENTS

| | | |
|---|---|---|
| JP | 2007-171048 A | 7/2007 |
| JP | 2016-151422 A | 8/2016 |
| JP | 2016-151423 A | 8/2016 |
| JP | 2017-44549 A | 3/2017 |
| JP | 2017-44550 A | 3/2017 |

* cited by examiner

*Primary Examiner* — Roy M Punnoose
(74) *Attorney, Agent, or Firm* — Nields, Lemack & Frame, LLC

(57) ABSTRACT

The invention provides a measuring instrument, which comprises an image pickup unit for acquiring an image of a range including an object to be measured, a distance measuring unit for two-dimensionally scanning a predetermined range in synchronization with an image acquisition and for measuring, an arithmetic control unit and an attitude detecting unit for detecting a tilt angle of the image pickup unit with respect to a horizontality, wherein the arithmetic control unit associates a measurement result and a detection result of the attitude detecting unit with each pixel on a scanning locus corresponding to an acquired image.

25 Claims, 13 Drawing Sheets

THE SAME DEFLECTION ANGLE

A AND A', B AND B' ARE ROTATED IN SYNCHRONIZATION

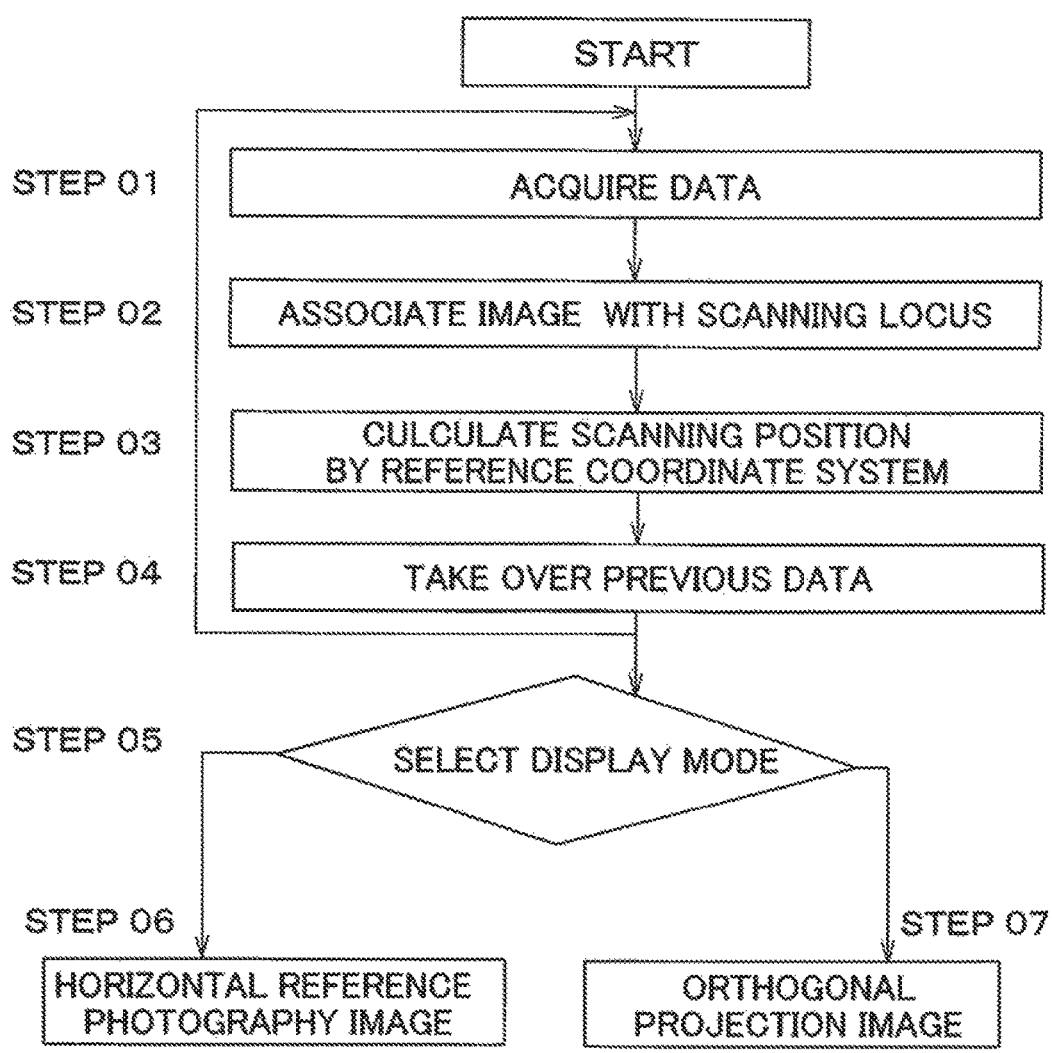

MEASURING INSTRUMENT AND SURVEYING SYSTEM

BACKGROUND OF THE INVENTION

The present invention relates to a measuring instrument and a surveying system which can measure a construction surface in a civil engineering work or the like in a real time.

In case of carrying out the civil engineering work, a height of a construction surface (a ground surface) is important.

In the civil engineering work, e.g., in a ground leveling work of a road or a developed land or the like, a work such as embankment or cutting is performed with the use of a construction heavy machine which is a movable body, e.g., a bulldozer or a power shovel. In order to perform the civil engineering work in a predetermined state, a height of a ground surface of a target region in the civil engineering work must be known.

Conventionally, there is a GPS device as a position measuring device used in the civil engineering work, and the GPS device is mounted on the bulldozer. A position is measured by the GPS device, and a position of a work tool is determined from a mechanical positional relation between a mounting position of the GPS device and the work tool. An operator recognizes the height of the ground surface from the position of the work tool.

In this case, the height of the ground surface to be measured is a position of a point with which the work tool is in contact, and the operator estimates the height and a state of a ground surface ahead which is to be worked based on an visual observation. For this reason, a caution is required for the work, and there is a problem in work efficiency. In particular, the estimation is difficult on an inclined surface, and a skill is also required.

Further, although the power shovel is used for forming a ditch of a waterworks or a sewerage, cutting a mountain region or landfilling a valley region, these works are performed while confirming a height of the ground surface during the construction, and a survey is frequently performed near a construction location aside from a heavy machine work. For this reason, the works are complicated, and a there is a problem in a workability.

SUMMARY OF THE INVENTION

It is an object of the present invention to provide a measuring instrument and a surveying system which enable measuring a height of a construction surface including a front side in a real time and thereby are configured to improve a workability.

To attain the object as described above, a measuring instrument according to the present invention comprises an image pickup unit for acquiring an image of a range including an object to be measured, a distance measuring unit for two-dimensionally scanning a predetermined range in synchronization with an image acquisition and for measuring, an arithmetic control unit and an attitude detecting unit for detecting a tilt angle of the image pickup unit with respect to a horizontality, wherein the arithmetic control unit associates a measurement result and a detection result of the attitude detecting unit with each pixel on a scanning locus corresponding to an acquired image.

Further, in the measuring instrument according to the present invention, the two-dimensional scan is a closed loop.

Further, in the measuring instrument according to the present invention, a pixel coordinate is converted into a vertical reference coordinate based on a tilt angle information detected by the attitude detecting unit, and a horizontal distance and a height information are calculated based on a scan information of pixel corresponding to the scanning locus and are added to the pixel.

Further, in the measuring instrument according to the present invention, an image acquired is converted into an ortho-image of a horizontal plane based on the tilt angle information included in the scan information.

Further, in the measuring instrument according to the present invention, the attitude detecting unit comprises a tilt sensor and an acceleration sensor as tilt sensors, and an output from the attitude detecting unit is a detection result from the acceleration sensor corrected based on comparison data of the tilt sensor and the acceleration sensor.

Further, a surveying system according to the present invention comprises a measuring instrument provided on a moving body such as a heavy machine or the like, a display device having a display unit, wherein a reference optical axis of the measuring instrument is provided tilting with respect to a horizontal plane at a predetermined angle and directed in a predetermined direction with respect to an advancing direction of the moving body, the attitude detecting unit detects a tilt angle of the reference optical axis, wherein the arithmetic control unit is configured to synthesize a measurement result provided by the distance measuring unit with an image acquired by the image pick up unit and to display on the display unit.

Further, in the surveying system according to the present invention, the image pickup unit is configured to acquire continuous images, the distance measuring unit is configured to two-dimensionally scan a predetermined range in synchronization with a frame image constituting the continuous images, and the arithmetic control unit is configured to combine the frame images in time series.

Further, in the surveying system according to the present invention, the arithmetic control unit is configured to calculate a moving distance and a change in height according to a movement of the moving body based on a scan information of a pixel at a point where the scanning loci cross each other in a combined image acquired by combining the frame images.

Further, in the surveying system according to the present invention, the attitude detecting unit comprises a tilt sensor and an acceleration sensor as tilt sensors, and an output from the attitude detecting unit is a detection result from the acceleration sensor corrected based on comparison data of the tilt sensor and the acceleration sensor.

Furthermore, in the surveying system according to the present invention, an auxiliary representation, which facilitates a recognition of a condition of a ground surface, is superimposed on an image and displayed.

According to the present invention, the measuring instrument comprises an image pickup unit for acquiring an image of a range including an object to be measured, a distance measuring unit for two-dimensionally scanning a predetermined range in synchronization with an image acquisition and for measuring, an arithmetic control unit and an attitude detecting unit for detecting a tilt angle of the image pickup unit with respect to a horizontality, wherein the arithmetic control unit associates a measurement result and a detection result of the attitude detecting unit with each pixel on a scanning locus corresponding to an acquired image. As a result, a measurement result of the object to be measured is synthesized with the acquired image in a real time, and based on the image, confirming and estimating a three-dimensional actual state of the object to be measured can be performed in a real time.

Further, according to the present invention, the surveying system comprises a measuring instrument provided on a moving body such as a heavy machine or the like, a display device having a display unit, wherein a reference optical axis of the measuring instrument is provided tilting with respect to a horizontal plane at a predetermined angle and directed in a predetermined direction with respect to an advancing direction of the moving body, the attitude detecting unit detects a tilt angle of the reference optical axis, wherein the arithmetic control unit is configured to synthesize a measurement result provided by the distance measuring unit with an image acquired by the image pick up unit and to display on the display unit. As a result, a state during an operation can be confirmed and estimated in a real time.

BRIEF DESCRIPTION OF THE DRAWINGS

FIG. 14 is a flowchart showing a flow of a measurement in the surveying system.

FIG. 15A shows an image when a measurement starts, and FIG. 15B and FIG. 15C show images after the movement.

FIG. 17A is a drawing showing a scanning locus when a series of closed loop scans like a floral pattern are performed with a reference optical axis as a center and FIG. 17B is a drawing showing a scanning locus when a scanning position is sequentially rotated (shifted) at each cycle of the series of closed loop scans like the floral pattern.

DETAILED DESCRIPTION OF THE PREFERRED EMBODIMENTS

A description will be given below on embodiments of the present invention by referring to the attached drawings.

Figure 1:
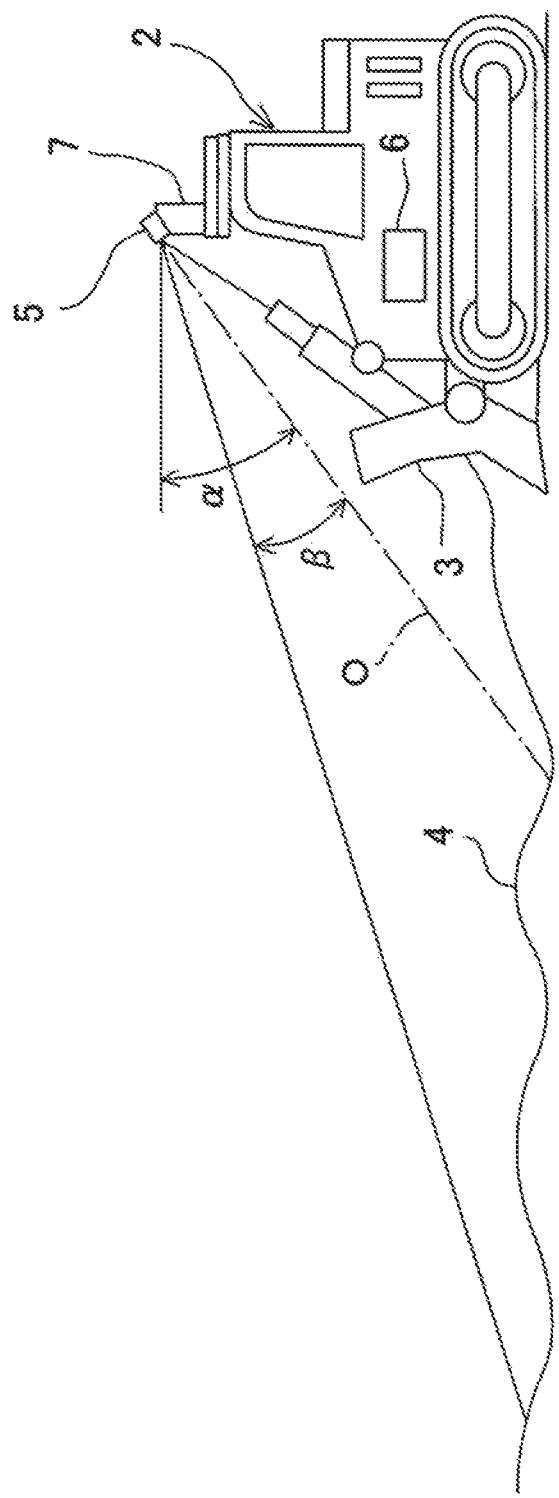
FIG. 1 is a schematical drasing of a surveying system according to an embodiment of the present invention.

FIG. 1 shows a case where a surveying system according to the present embodiment is installed in a bulldozer 2 which is one of heavy machines. In FIG. 1, a reference numeral 3 denotes a blade as a work tool, and a reference numeral 4 denotes a ground surface.

The surveying system includes a measuring instrument 5 provided at a position where a field of view is widely open, e.g., an upper side of an operation room and a display device 6 provided in the operation room.

The measuring instrument 5 is mounted via an attachment 7 and provided at a known position with respect to a mechanical reference point of the bulldozer 2 and thereby a height from a ground surface 4 is known.

The measuring instrument 5 has a reference optical axis O, and the reference optical axis O tilts at a predetermined tilt angle $\alpha$ with respect to a horizontality and directed to a front side of the bulldozer 2. The attachment 7 enables an attachment/detachment of the measuring instrument 5, and further enables setting the tilt angle $\alpha$ to a desired value.

The measuring instrument 5 is a laser scanner, and the measuring instrument 5 performs a rotational scan (scanning) with a deflection angle of $\beta$ around the reference optical axis O and can acquire point cloud data. Further, the measuring instrument 5 has an image pickup unit 14 (to be described later), and the image pickup unit 14 acquires an image of the reference optical axis O direction. The image pickup unit 14 has an image pickup optical axis which coincides with or is parallel to the reference optical axis O, and a field angle of the image pickup unit 14 is a size which is equal to or greater than a scanning range of the laser scanner.

The value of the tilt angle $\alpha$ and the deflection angle $\beta$ of the rotational scan are set so as to correspond with an operator's field of view during an operation, or are set so as to include a front range which enables the operator to grasp a condition of the ground surface 4 ahead and enables the operator to reflect the grasped condition to an operation of the blade 3.

In the present embodiment, both an acquisition of an image of the ground surface 4 and an acquisition of three-dimensional data of the ground surface 4 are performed by the measuring instrument 5 in a real time, and the operator is informed of a condition of the ground surface 4 by the display device 6, and thereby by an improvement in a certainty and a workability of the civil engineering work is achieved.

Figure 2:
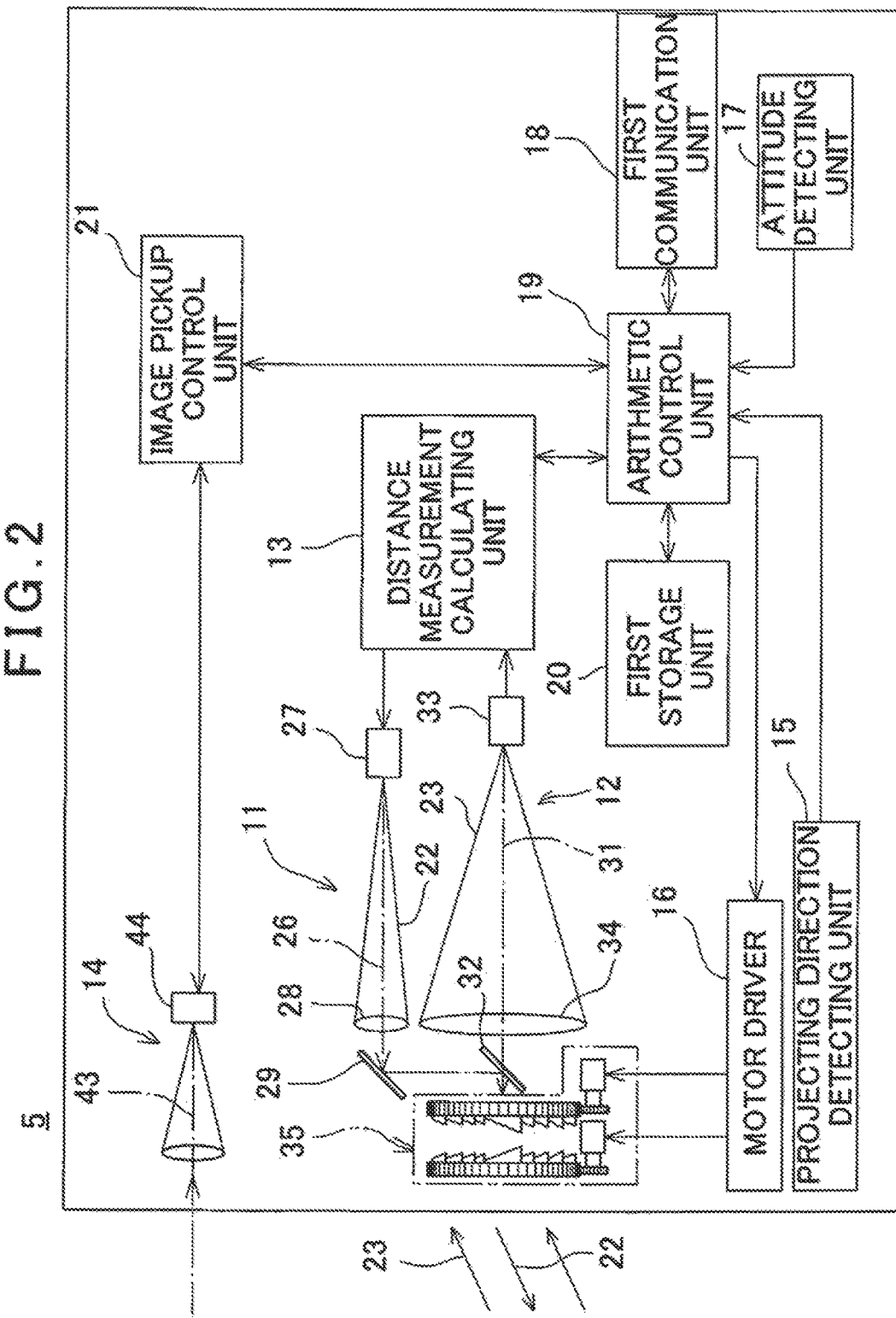
FIG. 2 is a schematical block diagram showing an example of a measuring instrument used in the surveying system.
Figure 3:
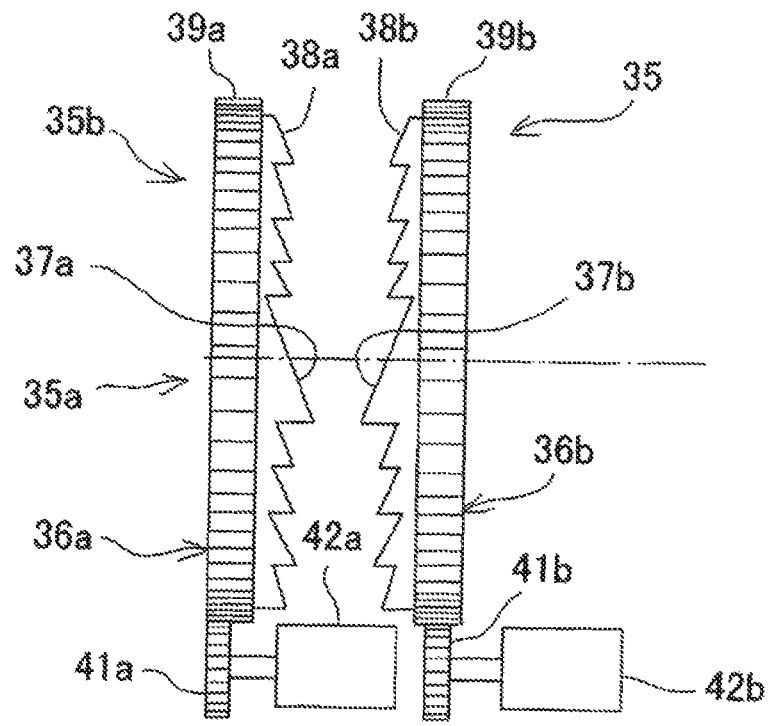
FIG. 3 is a side view of an optical axis deflecting unit used in the measuring instrument.

Next, a description will be given on the measuring instrument 5 by referring to FIG. 2 and FIG. 3.

The measuring instrument 5 includes a distance measuring light projecting unit 11, a light receiving unit 12, a distance measurement calculating unit 13, an image pickup unit 14, a projecting direction detecting unit 15, a motor driver 16, an attitude detecting unit 17, a first communication unit 18, an arithmetic control unit 19, a first storage unit 20 and an image pickup control unit 21 and a distance measuring light projecting unit 11, a light receiving unit 12, a distance measurement calculating unit 13, an image pickup unit 14, a projecting direction detecting unit 15, a motor driver 16, an attitude detecting unit 17, a first communication unit 18, an arithmetic control unit 19, a first storage unit 20 and an image pickup control unit 21 are integrated. It is to be noted that the distance measuring light projecting unit 11, the light receiving unit 12, the distance measurement calculating unit 13 or the like constitute a distance measuring unit.

The distance measuring light projecting unit 11 has a projection optical axis 26, and a light emitting element 27, e.g. a laser diode (LD), is provided on the projection optical axis 26. Further, a projecting lens 28 is provided on the projection optical axis 26. Further, by a first reflection mirror 29 as a deflecting optical component provided on the projection optical axis 26 and by a second reflection mirror 32 as a deflecting optical component provided on a light receiving optical axis 31 (to be described later), the projection optical axis 26 is deflected so as to coincide with the light receiving optical axis 31. The first reflection mirror 29 and the second reflection mirror 32 constitute a projection optical axis deflecting unit.

The light emitting element 27 emits a pulsed laser beam, and the distance measuring light projecting unit 11 projects the pulsed laser beam emitted from the light emitting element 27 as a distance measuring light 22.

A description will be given on the light receiving unit 12. A reflected distance measuring light 23 from an object to be measured (i.e., a measuring point) enters the light receiving unit 12. The light receiving unit 12 has the light receiving optical axis 31, and the light receiving optical axis 31 coincides with the projection optical axis 26 as deflected by the first reflection mirror 29 and the second reflection mirror 32.

An optical axis deflecting unit 35 (to be described later) is disposed on the projection optical axis 26 as deflected, i.e., on the light receiving optical axis 31. A straight optical axis passing through a center of the optical axis deflecting unit 35 is the reference optical axis O. The reference optical axis O coincides with the projection optical axis 26 or the light receiving optical axis 31 when the optical axis 26 or 31 is not deflected by the optical axis deflecting unit 35.

An image forming lens 34 is disposed on the light receiving optical axis 31 which passes through the optical axis deflecting unit 35 and enters, and a photodetector 33, e.g., a photodiode (PD) is also provided. The image forming lens 34 forms an image of a reflected distance measuring light 23 on the photodetector 33. The photodetector 33 receives the reflected distance measuring light 23 and produces a light receiving signal. The light receiving signal is input to the distance measurement calculating unit 13. The distance measurement calculating unit 13 determines a distance to the measuring point based on the light receiving signal.

Figure 4:
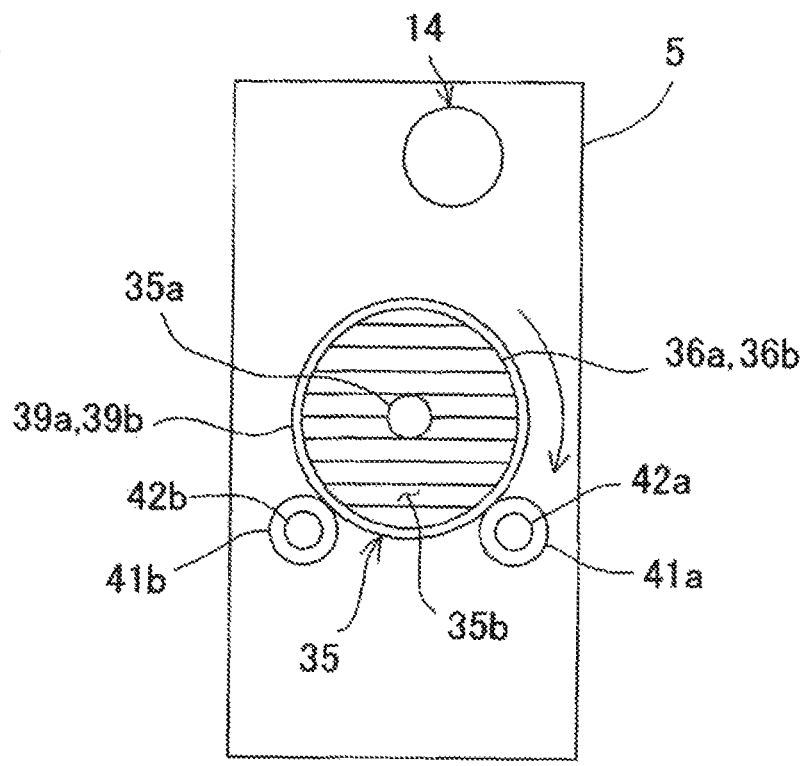
FIG. 4 is a front view of the optical axis deflecting unit.

A description will be given on the optical axis deflecting unit 35 by referring to FIG. 3 and FIG. 4.

The optical axis deflecting unit 35 is constituted of a pair of optical prisms 36a and 36b. The optical prisms 36a and 36b are designed in a disk-like shape respectively, disposed perpendicularly crossing the light receiving optical axis 31, overlapped on each other and arranged in parallel to each other. As for the optical prisms 36a and 36b, a Fresnel prism is preferably used respectively in order to reduce a size of the instrument.

A central part of the optical axis deflecting unit 35 is designed as a distance measuring light deflecting unit 35a which is a first optical axis deflecting unit which the distance measuring light 22 passes through and is projected from. A portion of the optical axis deflecting unit 35 except the central part is designed as a reflected distance measuring light deflecting unit 35b which is a second optical axis deflecting unit which the reflected distance measuring light 23 passes and enters.

The Fresnel prisms used as the optical prisms 36a and 36b are constituted of prism elements 37a and 37b and a large number of prism elements 38a and 38b which are formed in parallel to each other respectively, and have a disk-like shape. The optical prisms 36a and 36b, each of the prism elements 37a and 37b and the prism elements 38a and 38b have the same optical characteristics, respectively.

The prism elements 37a and 37b constitute the distance measuring light deflecting unit 35a, and the prism elements 38a and 38b constitute the reflected distance measuring light deflecting unit 35b.

The Fresnel prism may be manufactured from an optical glass or the Fresnel prism may be molded by using an optical plastic material. By molding the Fresnel prism by using the optical plastic material, a low cost Fresnel prism can be manufactured.

The optical prisms 36a and 36b are arranged in such a manner that the optical prisms 36a and 36b can independently and individually rotate with the light receiving optical axis 31 as the center, respectively. By independently controlling rotating directions, rotation amounts and rotating speeds, the optical prisms 36a and 36b deflect a projection optical axis 26 of the distance measuring light 22 as emitted in an arbitrary direction, and deflect the light receiving optical axis 31 of the reflected distance measuring light 23 as received in parallel to the projection optical axis 26.

An outer shape of each of the optical prisms 36a and 36b is designed as a circle shape with the light receiving optical axis 31 as the center. Taking an expansion of the reflected distance measuring light 23 into consideration, diameters of the optical prisms 36a and 36b are set so that a sufficient light amount can be obtained.

A ring gear 39a is fitted with an outer periphery of the optical prism 36a, and a ring gear 39b is fitted with an outer periphery of the optical prism 36b.

A driving gear 41a meshes with the ring gear 39a, and the driving gear 41a is fixed to an output shaft of a motor 42a. Similarly, a driving gear 41b meshes with the ring gear 39b, and the driving gear 41b is fixed to an output shaft of a motor 42b. The motors 42a and 42b are electrically connected to the motor driver 16.

As the motors 42a and 42b, a motor which can detect a rotation angle or a motor which rotates corresponding to a driving input value, e.g., a pulse motor is used. Alternatively, by using a rotation angle detector which detects a rotation amount (the rotation angle) of the motor, e.g., an encoder or the like, the rotation amount of the motor may be detected. The rotation amounts of the motors 42a and 42b are detected respectively, and the motors 42a and 42b are individually controlled by the motor driver 16.

The driving gears 41a and 41b and the motors 42a and 42b are provided at positions not interfering with the distance measuring light projecting unit 11, for instance, on a lower side of the ring gears 39a and 39b.

The projecting lens 28, the first reflection mirror 29, the second reflection mirror 32, the distance measuring light deflecting unit 35a or the like make up a light projecting optical system, and the reflected distance measuring light deflecting unit 35b, the image forming lens 34 or the like make up a light receiving optical system.

The distance measurement calculating unit 13 controls the light emitting element 27, and make the light emitting element 27 to emit a pulsed laser beam as a distance measuring light. The projection optical axis 26 is deflected by the prism elements 37a and 37b (the distance measuring light deflecting unit 35a) so that the distance measuring light is directed toward a measuring point.

A reflected distance measuring light 23 as reflected from an object to be measured enters through the prism elements 38a and 38b (the reflected distance measuring light deflecting unit 35b) and the image forming lens 34, and is received by the photodetector 33. The photodetector 33 sends a light receiving signal to the distance measurement calculating unit 13, the distance measurement calculating unit 13 performs a distance measurement of a measuring point (a point irradiated with the distance measuring light) for each pulsed light based on a light receiving signal from the photodetector 33, and distance measurement data is stored in the first storage unit 20. Thus, by performing the distance measurement for each pulsed light while scanning with a distance measuring light 22, point cloud data can be obtained. That is to say, the measuring instrument 5 functions as a laser scanner.

The image pickup unit 14 is a camera which has an image pickup optical axis 43 parallel to the reference optical axis O of the measuring instrument 5 and has a field angle of, e.g., 500, and acquires image data including a scanning range of the measuring instrument 5. A relation between the image pickup optical axis 43 and the projection optical axis 26 and a relation between the image pickup optical axis 43 and the reference optical axis O are known. The image pickup unit 14 can acquire a video images or continuous images.

The image pickup control unit 21 controls an image pickup of the image pickup unit 14. In a case where the image pickup unit 14 picks up the video images or the continuous images, the image pickup control unit 21 synchronizes a timing of acquiring a frame image constituting the video images or the continuous images with a timing of performing a distance measurement by the measuring instrument 5.

An image pickup element 44 of the image pickup unit 14 is a CCD or a CMOS sensor which is an aggregate of pixels, and it is so arranged that a position of each pixel on an image element can be specified. For example, each pixel has pixel coordinates in a coordinate system having the image pickup optical axis 43 as an origin point, and a position on an image element is specified by the pixel coordinates.

The projecting direction detecting unit 15 counts driving pulses input to the motors 42a and 42b and detects rotation angles of the motors 42a and 42b. Alternatively, the projecting direction detecting unit 15 detects the rotation angles of the motors 42a and 42b based on a signal from an encoder. Further, the projecting direction detecting unit 15 calculates rotational positions of the optical prisms 36a and 36b based on the rotation angles of the motors 42a and 42b. Further, the projecting direction detecting unit 15 calculates a deflection angle and a projecting direction of the distance measuring light based on refractive indexes and the rotational positions of the optical prisms 36a and 36b, and calculation results are input to the arithmetic control unit 19.

In the first storage unit 20, various types of programs are stored. These programs include: a distance measuring program for controlling a measuring operation, a control program for making the motor driver 16 control drivings of the motors 42a and 42b, a direction angle calculating program for calculating direction angles (a horizontal angle and a vertical angle) of the projection optical axis 26 based on calculation results in the projecting direction from the projecting direction detecting unit 15, an image processing program for carrying out an image processing, e.g., a synthesization of images acquired by the image pickup unit 14, a tracking between images or the like, a communication program for performing data communication to and from the display device 6, or the like. Further, in the first storage unit 20, the measurement results, e.g., distance measuring data, image data, or the like are stored.

The arithmetic control unit 19 executes the processings, e.g., control of the motors, calculation of the direction angles, the synthesization of images, the tracking between images, the data communication, or the like based on the programs stored in the first storage unit 20.

Next, a description will be given on the attitude detecting unit 17 by referring to FIG. 5 to FIG. 7.

Figure 5:
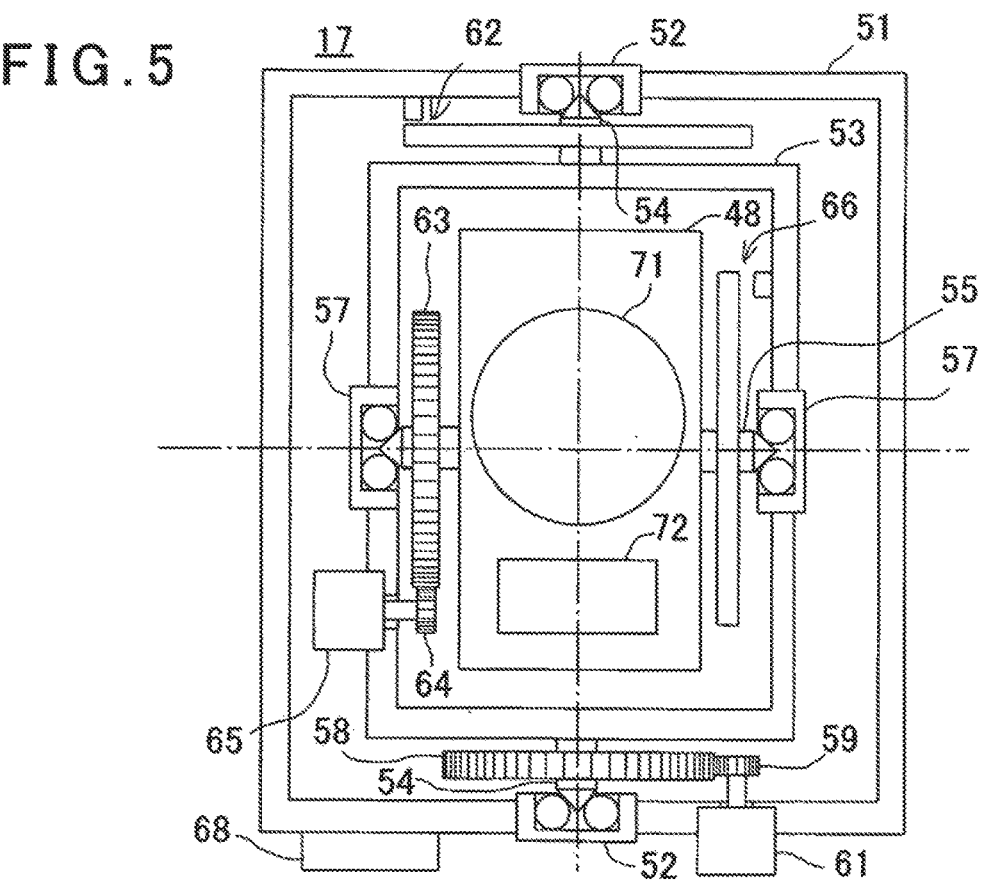
FIG. 5 is a plan view of an attitude detecting unit used in the measuring instrument.
Figure 6:
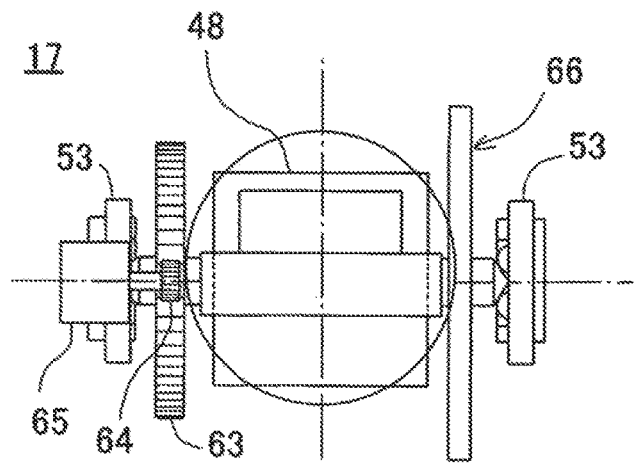
FIG. 6 is a front view of the attitude detecting unit.

FIG. 5 shows a plan view in a state where the attitude detecting unit 17 is horizontally installed, and FIG. 6 shows a front view of the attitude detecting unit 17. Even if the attitude detecting unit 17 is installed in an arbitrary state, the attitude detecting unit 17 can detect a horizontality.

The attitude detecting unit 17 includes a horizontal detecting unit 48 which detects the horizontality, and the horizontal detecting unit 48 has, as described below, such a structure that the horizontal detecting unit 48 is horizontally supported via a gimbal mechanism.

An inner frame 53 designed in a rectangular frame shape is provided inside an outer frame 51 designed in a rectangular frame shape, and the horizontal detecting unit 48 is provided inside the inner frame 53. The outer frame 51 is fixed to a structural member such as a casing (not shown) or the like of the measuring instrument 5.

First horizontal shafts 54 and 54 are protruded from an upper surface and a lower surface (see FIG. 5) of the inner frame 53. The first horizontal shafts 54 and 54 are rotatably fitted in the bearings 52 and 52 provided on the outer frame 51. The first horizontal shafts 54 and 54 have a first horizontal axis extending in a horizontal direction, and the inner frame 53 can rotate around the first horizontal shafts 54 and 54 over 360° in a vertical direction.

The horizontal detecting unit 48 is supported by a second horizontal shaft 55, and both end portions of the second horizontal shaft 55 are rotatably fitted to bearings 57 and 57 provided to the inner frame 53. The second horizontal shaft 55 has a second horizontal axis which orthogonally crosses the first horizontal axis within the same plane and extends in a horizontal direction, and the horizontal detecting unit 48 can rotate around the second horizontal shaft 55 over 360° in a vertical direction.

Thus, the horizontal detecting unit 48 is rotatably supported in two axial directions with respect to the outer frame 51, and a mechanism which rotatably supports the inner frame 53 and a mechanism which rotatably supports the horizontal detecting unit 48 constitute a gimbal mechanism. Therefore, the horizontal detecting unit 48 is supported with respect to the outer frame 51 via the gimbal mechanism, and further there is no mechanism which restricts a rotation of the inner frame 53, and hence the horizontal detecting unit 48 can freely rotate with respect to the outer frame 51 in all directions.

A first driven gear 58 is fixed to one of the first horizontal shafts 54 and 54, e.g., on the first horizontal shaft 54 of a lower side in FIG. 5, and the first driven gear 58 meshes with a first driving gear 59. Further, a first motor 61 is provided on a lower surface of the outer frame 51, and the first driving gear 59 is fitted to an output shaft of the first motor 61.

A first encoder 62 is provided on the other of the first horizontal shafts 54 and 54. The first encoder 62 is adapted to detect a first rotation angle (a first tilt angle) of the inner frame 53 with respect to the outer frame 51.

A second driven gear 63 is fixed to one end portion of the second horizontal shaft 55, and the second driven gear 63 meshes with a second driving gear 64. Further, a second motor 65 is provided on a side surface (a left side surface in the drawing) of the inner frame 53, and the second driving gear 64 is fitted to an output shaft of the second motor 65.

A second encoder 66 is provided on the other end portion of the second horizontal shaft 55, and the second encoder 66 is adapted to detect a second rotation angle (a second tilt angle) of the horizontal detecting unit 48 with respect to the inner frame 53.

Figure 7:
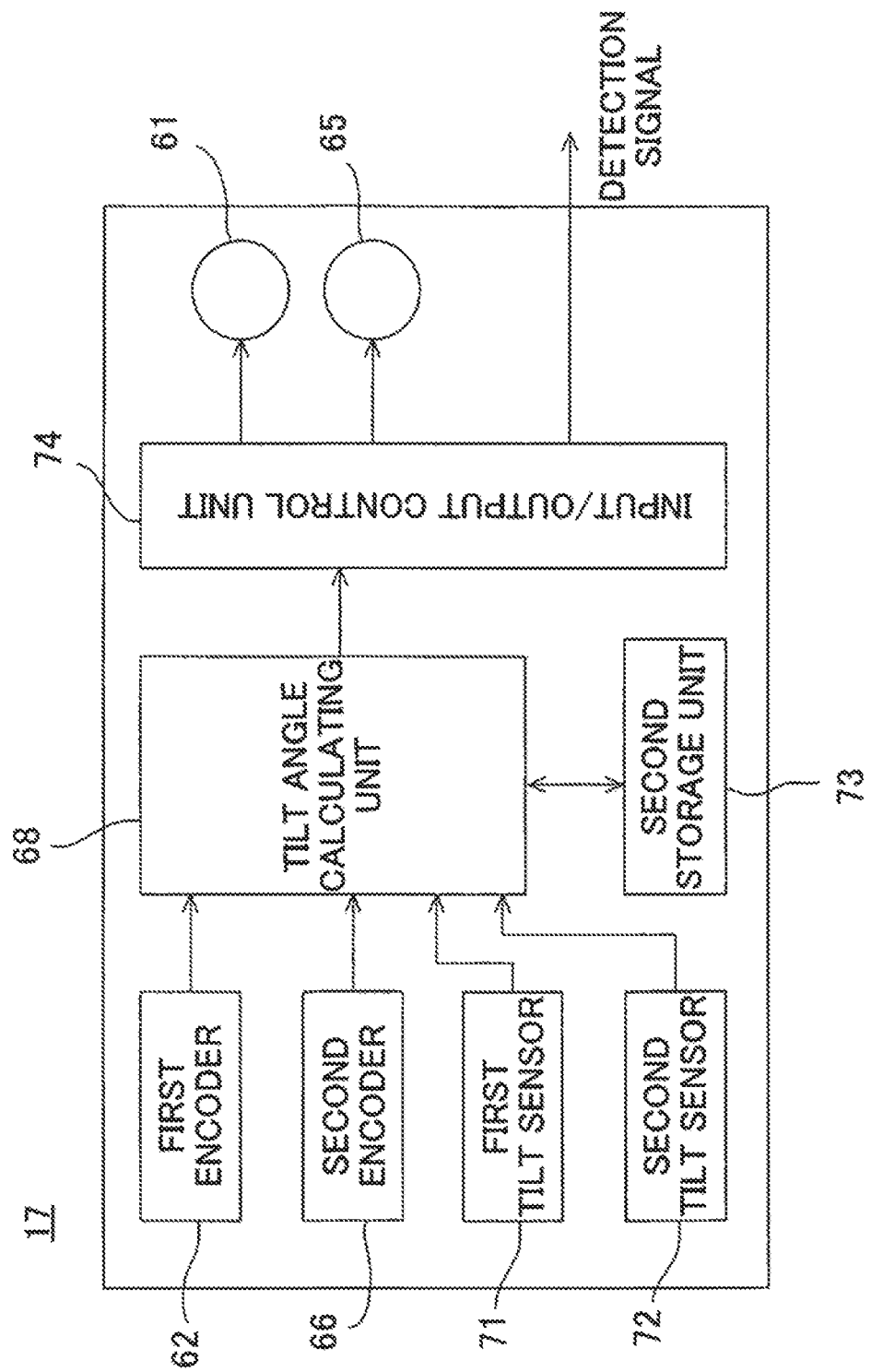
FIG. 7 is a schematical block diagram of the attitude detecting unit.

The first encoder 62 and the second encoder 66 are electrically connected to a tilt angle calculating unit 68 (see FIG. 7).

The horizontal detecting unit 48 has a first tilt sensor 71 and a second tilt sensor 72, and the first tilt sensor 71 and the second tilt sensor 72 are electrically connected to the tilt angle calculating unit 68.

A further description will be given on the attitude detecting unit 17 by referring to FIG. 7.

The attitude detecting unit 17 comprises the first encoder 62, the second encoder 66, the first tilt sensor 71, the second tilt sensor 72, the tilt angle calculating unit 68, the first motor 61 and the second motor 65. Further, the attitude detecting unit 17 comprises a second storage unit 73 and an input/output control unit 74.

In the second storage unit 73, various types of programs are stored. These programs include: a calculation program for an attitude detection, a control program for driving the first motor 61 and the second motor 65 so that the horizontal detecting unit 48 becomes horizontal, or the like. Further, in the second storage unit 73, data such as comparison data and calculation data, or the like are stored. The comparison data is a data table showing a comparison result of a detection result of the first tilt sensor 71 and a detection result of the second tilt sensor 72.

The input/output control unit 74 drives the first motor 61 and the second motor 65 based on a control command output from the tilt angle calculating unit 68, tilts the horizontal detecting unit 48 and the inner frame 53 and controls the horizontal detecting unit 48 so as to detect a horizontality.

The first tilt sensor 71 is for detecting the horizontality with high accuracy, e.g., a tilt sensor, and is a tilt detector which allows a detection light to enter a horizontal liquid surface and detects a horizontality according to a change in a reflection angle of a reflection light, or is a bubble tube which detects a tilt based on a positional change in a sealed air bubble. Further, the second tilt sensor 72 is for detecting a change in a tilt with high responsiveness, and is, e.g., an acceleration sensor.

It is to be noted that both the first tilt sensor 71 and the second tilt sensor 72 can individually detect tilts in two axial directions, i.e., a rotating direction (a tilting direction) as detected by the first encoder 62 and a rotating direction (a tilting direction) as detected by the second encoder 66.

The tilt angle calculating unit 68 calculates a tilt angle and a tilting direction based on the detection results from the first tilt sensor 71 and the second tilt sensor 72. Further, the tilt angle calculating unit 68 calculates a rotation angle of the first encoder 62 and a rotation angle of the second encoder 66 corresponding to the tilt angle and the tilting direction.

Further, the tilt angle calculating unit 68 controls the first motor 61 and the second motor 65 based on a signal from the second tilt sensor 72 when a fluctuation in a tilt is large and when a change in a tilt is rapid, or the tilt angle calculating unit 68 controls the first motor 61 and the second motor 65 based on a signal from the first tilt sensor 71 when the fluctuation in the tilt is small and when the change in the tilt is slow, that is, in a condition where the first tilt sensor 71 is capable of following up.

Further, when the tilt angel calculating unit 68 controls the first motor 61 and the second motor 65 based on the signal from the second tilt sensor 72, the tilt angle calculating unit 68 corrects a detection result obtained by the second tilt sensor 72 based on the comparison data. This correction enables to improve the detection result provided by the second tilt sensor 72 to a detection accuracy of the first tilt sensor 71. Thus, in a tilt detection by the attitude detecting unit 17, the high responsiveness can be realized while maintaining the high accuracy.

By synthesizing the rotation angle of the first encoder 62 and the calculated rotation angle of the second encoder 66 thus calculated, a tilt angle and a tilting direction are calculated. The tilt angle and the tilting direction correspond to a tilt angle and a tilting direction of an instrument where the attitude detecting unit 17 is attached with respect to a horizontality (i.e., a tilt angle and a tilting direction of the outer frame 51 designed in the rectangular frame shape).

Thus, the first motor 61, the second motor 65, the first encoder 62, the second encoder 66 and the tilt angle calculating unit 68 constitute a relative tilt angle detecting unit.

It is to be noted that, in a case where the attitude detecting unit 17 is horizontally installed (in a state where the outer frame 51 is horizontal), the attitude detecting unit 17 is set so that the first tilt sensor 71 detects the horizontality and further is set so that both an output of the first encoder 62 and an output of the second encoder 66 indicate a reference position (a rotation angle 0°).

In a state where the measuring instrument 5 is attached to the bulldozer 2 in the present embodiment, the horizontal detecting unit 48 (see FIG. 5) is horizontally maintained, the attitude detecting unit 17 detects the horizontality and also detects that the measuring instrument 5 tilts with respect to an advancing direction at a tilt angle α. Further, the attitude detecting unit 17 detects the horizontality and simultaneously detects a verticality.

Figure 8:
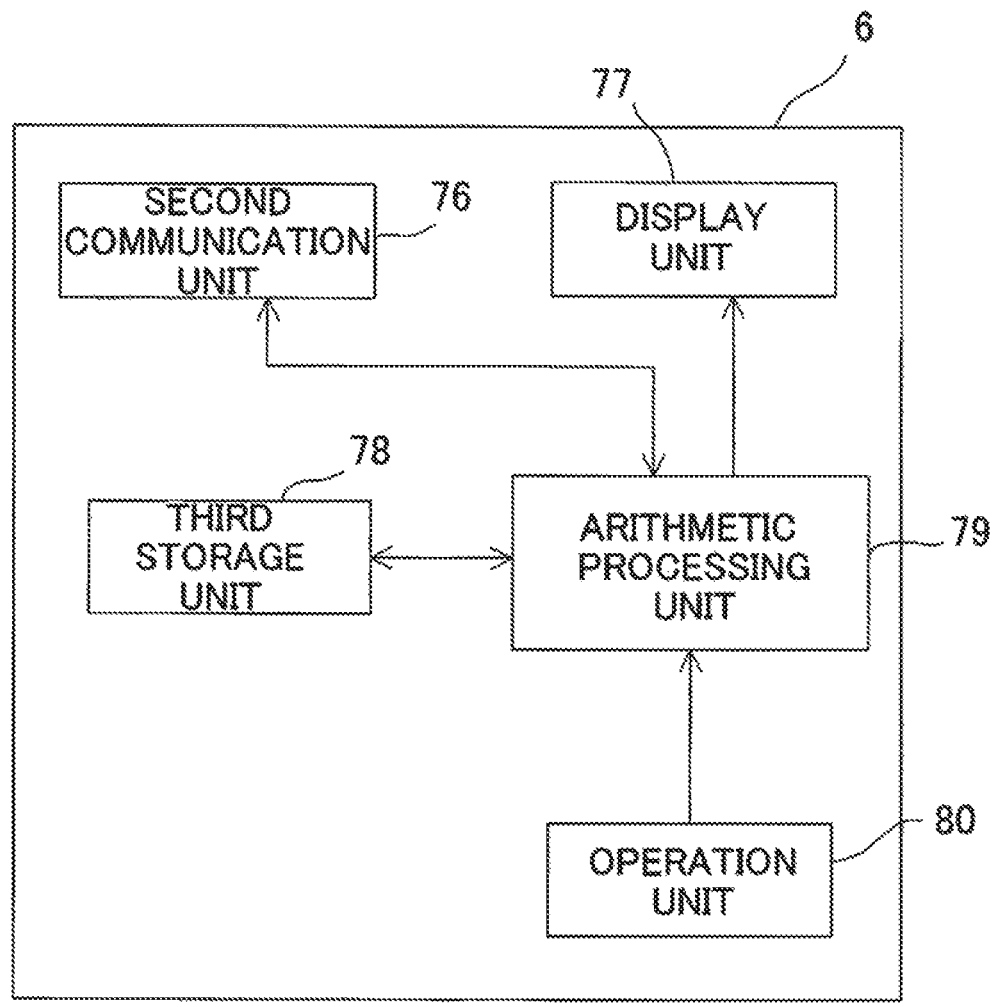
FIG. 8 is a schematical block diagram of a display device used in the surveying system.

A description will be given on general features of the display device 6 by referring to FIG. 8.

The display device 6 mainly includes a second communication unit 76, a display unit 77, a third storage unit 78, an arithmetic processing unit 79 and an operation unit 80.

The second communication unit 76 is for performing a data communication to and from the first communication unit 18 by a means as required such as a wired or a wireless means or the like, and a result of performing a calculation in the arithmetic control unit 19 is transmitted to, or image data or the like picked up by the image pickup unit 14 is transmitted to or data accumulated in first storage unit 20 is transmitted to the second communication unit 76.

In the third storage unit 78, various types of programs are stored. These programs include: a communication program, a video program for displaying image data on the display unit 77, a command creation program for converting an input operation from the operation unit 80 into a command signal, or the like, and further in the third storage unit 78, a data storage region is formed therein, and data such as distance measurement data, image data, or the like are stored.

The arithmetic processing unit 79 executes a calculation or a processing as required in accordance with the programs as described above.

A description will be given on a measurement operation of the measuring instrument 5.

First, a description will be given on a measuring operation by the measuring instrument 5 by referring to FIG. 9A, FIG. 9B and FIG. 9C.

Figure 9A:
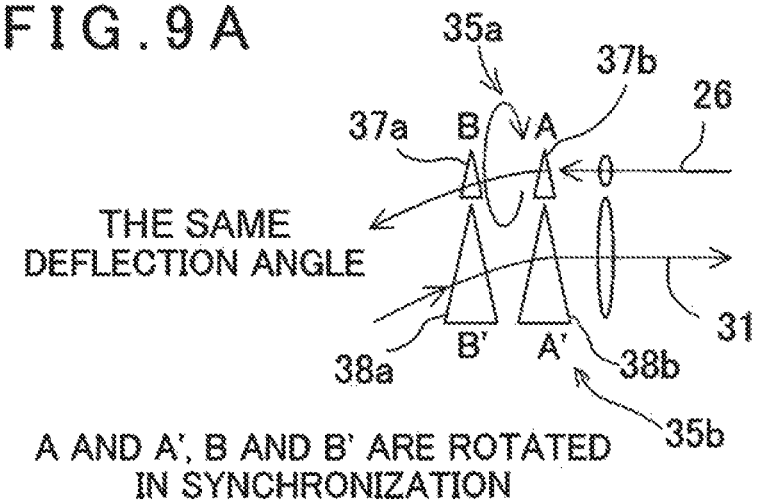
FIG. 9A, FIG. 9B and FIG. 9C are explanatory drawings showing an action of the optical axis deflecting unit.

It is to be noted that, in order to simplify an explanation, in FIG. 9A the optical prisms 36a and 36b are shown by separating the prism elements 37a and 37b and the prism elements 38a and 38b. Further, the prism elements 37a and 37b and the prism elements 38a and 38b as shown in FIG. 9A are in a state where a maximum deflection angle can be obtained. Further, the minimum deflection angle is a position where either one of the optical prisms 36a and 36b is rotated by 180°, the deflection angle becomes 0°, and an optical axis of a laser beam (the projection optical axis 26) projected through the optical prisms 36a and 36b coincides with the reference optical axis O.

A distance measuring light 22 is emitted from the light emitting element 27, and the distance measuring light 22 is turned to a parallel luminous flux by the projecting lens 28 and is projected toward an object to be measured or a measurement target area through the distance measuring light deflecting unit 35a (the prism elements 37a and 37b). Here, by passing through the distance measuring light deflecting unit 35a, the distance measuring light 22 is deflected in a direction as required by the prism elements 37a and 37b and is projected.

A reflected distance measuring light 23 as reflected by the object to be measured or the measurement target area is entered through the reflected distance measuring light deflecting unit 35b (the prism elements 38a and 38b) and is focused on the photodetector 33 by the image forming lens 34.

When the reflected distance measuring light 23 passes through the reflected distance measuring light deflecting unit 35b, an optical axis of the reflected distance measuring light 23 is deflected by the prism elements 38a and 38b so as to coincide with the light receiving optical axis 31 (FIG. 9A).

By combining a rotation position of the optical prism 36a with a rotation position of the optical prism 36b, a deflecting direction and a deflection angle of the distance measuring light 22 to be projected can be arbitrarily changed. By detecting the rotation positions of the optical prism 36a and the optical prism 36b, the deflecting direction and the deflection angle are detected.

Further, in a state where a positional relation between the optical prism 36a and the optical prism 36b is fixed (that is, in a state where the deflection angle obtained by the optical prism 36a and the optical prism 36b is fixed), the optical prism 36a and the optical prism 36b are integrally rotated by the motors 42a and 42b. A locus drawn by the distance measuring light 22 passing through the distance measuring light deflecting unit 35a becomes a circular cone with a vertical angle β which has a center of the optical axis deflecting unit 35 as a vertex and has the reference optical axis O as a center. Therefore, a locus of a projecting point of the distance measuring light 22 on a plane perpendicular to the reference optical axis O is a circle and, as shown in FIG. 1, a locus on a ground surface which tilts with respect to the reference optical axis O is a quasi-elliptic shape having a long axis in an advancing direction.

Therefore, when the optical axis deflecting unit 35 is rotated while emitting a pulsed laser beam from the light emitting element 27, the distance measuring light 22 can be scanned by the circular or quasi-elliptic locus (hereinafter, referred as a circular locus).

It is to be noted that it is needless to say that the reflected distance measuring light deflecting unit 35b rotates integrally with the distance measuring light deflecting unit 35a.

Figure 9B:
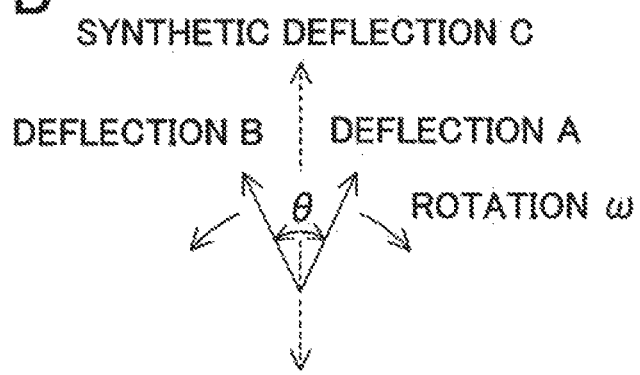

Next, FIG. 9B shows a case where the optical prism 36a and the optical prism 36b are relatively rotated. Assuming that a deflecting direction of the optical axis as deflected by the optical prism 36a is a deflection "A" and a deflecting direction of the optical axis as deflected by the optical prism 36b is a deflection "B", the deflection of the optical axes by the optical prisms 36a and 36b becomes a synthetic deflection "C" as an angle difference θ between the optical prisms 36a and 36b.

Figure 9C:
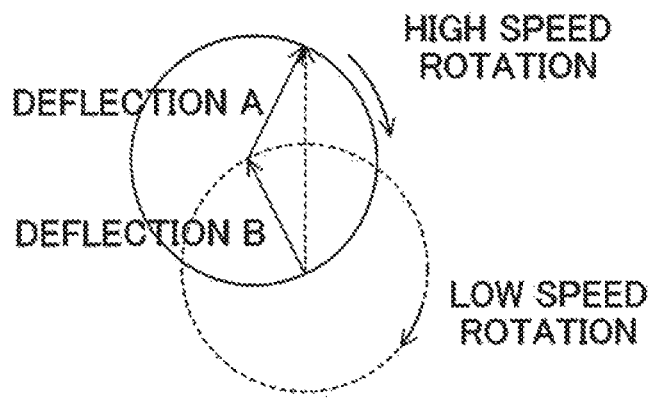

Further, as shown in FIG. 9C, when the optical prism 36b is rotated at a rotating speed lower than a rotating speed of the optical prism 36a, since the distance measuring light 22 is rotated while the angle difference θ gradually increases, the scanning locus of the distance measuring light 22 becomes a spiral form.

Furthermore, by individually controlling the rotating directions and the rotating speeds of the optical prism 36a and the optical prism 36b, various scanning states, e.g., a state where the scanning locus of the distance measuring light 22 is made in a projecting direction with the projection optical axis 26 as the center (scanning in a radial direction), or in the horizontal direction, or in the vertical direction, or the like can be obtained.

In a state where the measuring instrument 5 is fixed, controlling the respective rotations of the optical prism 36a and the optical prism 36b enables scanning of the distance measuring light 22 in a range of the vertical angle 2β, and acquiring point cloud data in the range of the vertical angle 2β.

As a scan mode of the measuring instrument 5 in the present embodiment, a deflection angle by the optical axis deflecting unit 35 (the optical prisms 36a and 36b) is fixed (a known angle β), the optical prisms 36a and 36b are integrally rotated and a two-dimensional scan (e.g., a circular scan) is performed. In a process of the circular scan, a distance measurement is performed for each light pulse.

It is to be noted that the scan mode is not restricted to the circular scan. As described above, by combination of the rotations of the optical prism 36a and the optical prism 36b, an arbitrary two-dimensional scan mode can be obtained. Further, as a preferable scan mode, a two-dimensional closed loop scan is preferable, but the closed loop scan does not have to be a perfectly closed loop scan. As to be described later, it will suffice that an intersection by the closed loop scans before and after the movement is obtained when a closed loop is moved.

The scan is performed with the distance measuring light 22, the distance measurement is performed and, at the same time, the continuous images are acquired by the image pickup unit 14. As described above, the image pickup control unit 21 synchronously controls the acquisition of a frame image and the scan by the measuring instrument 5. By completing the closed loop of the scan in a shorter time than a frame image acquisition interval, a measurement result of one closed loop can be obtained for each frame image.

Further, a projection directional angle of each pulsed distance measuring light during scanning can be detected by the rotation angles of the motors 42a and 42b, and by associating the projection directional angle with the distance measurement data, the arithmetic control unit 19 can provide three-dimensional distance measurement data.

A description will be given on an action of a surveying system according to the present embodiment by referring to FIG. 10 and FIG. 11.

Figure 10:
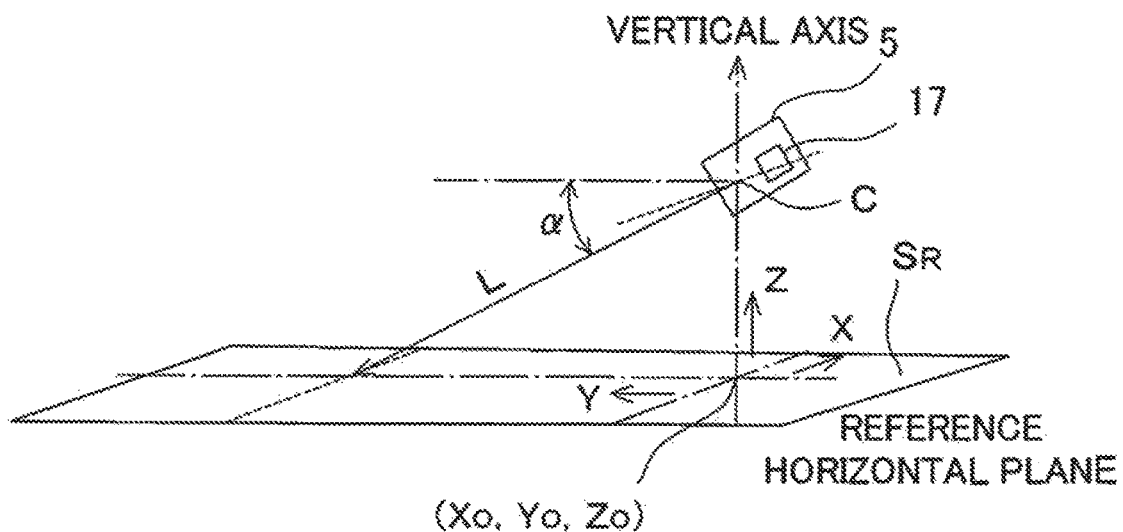
FIG. 10 is a drawing showing a reference coordinate system in the surveying system.

FIG. 10 is a drawing showing a reference coordinate system.

A vertical line passing through a distance measuring reference point C of the measuring instrument 5 is assumed to be a vertical axis Z, and a reference horizontal plane SR is set, in which the reference horizontal plane SR has a point, through which the vertical axis Z passes, as an origin point. The reference horizontal plane SR acts as a reference for measuring a height of the ground surface 4, and the reference horizontal plane SR may be at an adequate height, for instance, the reference horizontal plane SR is set, in which a contact surface of the bulldozer 2 is determined as a height 0. In this case, a height H of a distance measuring reference point C of the measuring instrument 5 can be obtained from a mechanical height with respect to the reference horizontal plane SR. Further, within the reference horizontal plane SR, a two-dimensional coordinate system (a reference coordinate system) is set, in which an advancing direction of the bulldozer 2 is a Y axis and a direction orthogonal with respect to the advancing direction is an X axis. It is to be noted that a three-dimensional coordinate system is formed of the vertical axis Z, the Y axis and the X axis, and a coordinate of the origin point is represented as X0, Y0, Z0.

As described above, since the measuring instrument 5 is provided in a condition where the measuring instrument 5 tilts with respect to a horizontality by a tilt angle α, the measuring instrument 5 also tilts with respect to the vertical axis Z by an angle (90°−α).

Figure 11:
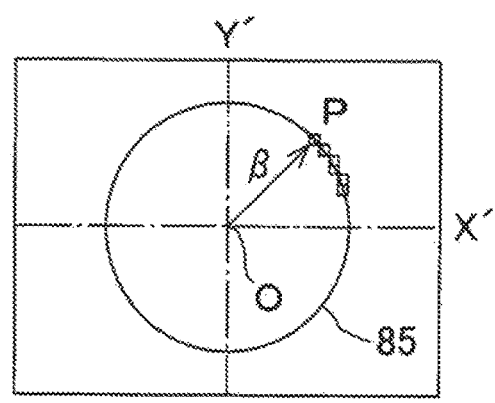
FIG. 11 is an explanatory drawing showing a correspondence between an acquired image and a circular scan in the surveying system.

FIG. 11 shows an acquired image, and a coordinate system X'-Y' of a field angel with an origin point is set, in which a reference optical axis O is treated as the origin point. Therefore, the distance measuring light 22 is rotated around the reference optical axis O by a deflection angle of β.

Figure 12:
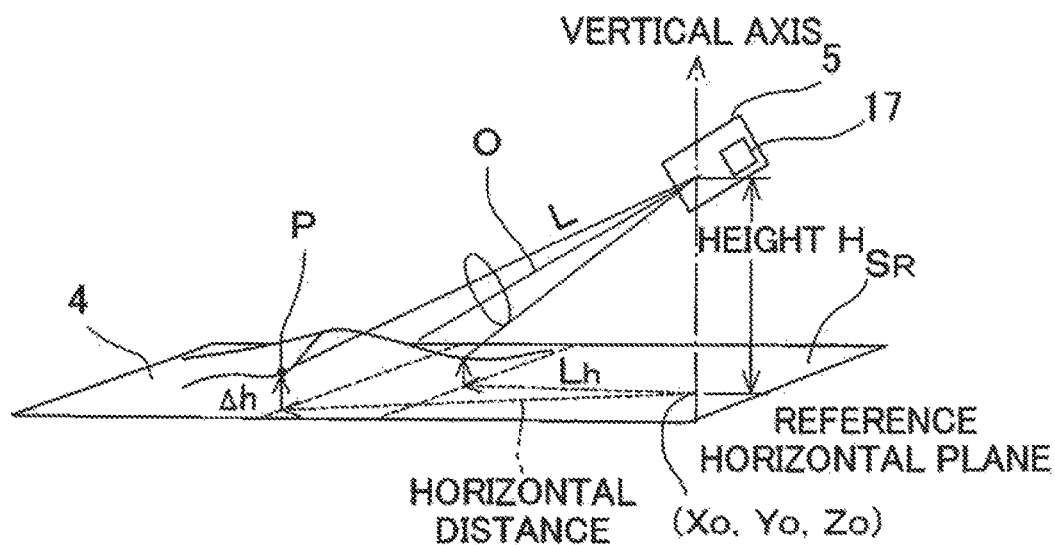
FIG. 12 is an explanatory drawing showing a height measurement when there is a rise in a measurement portion of a ground surface.

FIG. 12 shows a relation between an origin point and a ground surface 4. With respect to a projecting point P on the ground surface 4, when the distance measuring light 22 is projected on the reference optical axis O, the measuring instrument 5 measures a slope distance L to the projecting point P.

A height Δh of the projecting point P with respect to the origin point is Δh=H−L sin α, and a horizontal distance Ln to the projecting point P is Ln=L cos α. Further, a coordinate of the projecting point P within the reference horizontal plane SR is (0, L cos α, 0).

A deflection angle β of the distance measuring light 22 is fixed during the measurement, and further a rotation angle ω of the circular scan is detected by the projecting direction detecting unit 15 and a direction angle from the reference optical axis O as a base point is detected by the projecting direction detecting unit 15. The slope distance L is determined by the distance measurement calculating unit 13. Therefore, in the arithmetic control unit 19, the height and the horizontal distance of the projecting point P are obtained based on the deflection angle, the direction angle, the slope distance and the tilt angle information as detected by the attitude detecting unit 17, and the X, Y, Z components on the horizontal reference plane SR are also obtained.

Further, by associating a coordinate value (a positional information) with a pixel positioned at the projecting point P, an image with the positional information can be acquired in pixels. The positional information in pixels is stored in the first storage unit 20. It is possible to know a rough front left and right distances in a display screen from the pixels corresponding to a scanning locus 85.

Figure 13:
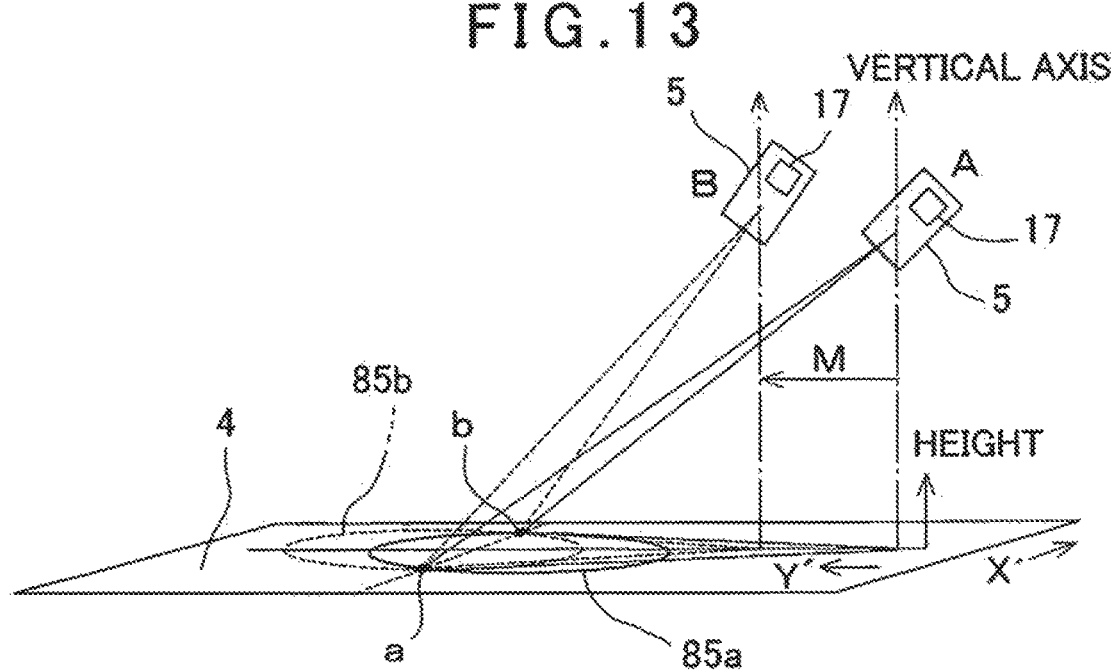
FIG. 13 is an explanatory drawing showing a measurement when a bulldozer moves in the surveying system or when a tilt of an optical axis of a measuring instrument changes.

Next, a description will be given on a measurement in a state where the bulldozer 2 moves while performing a ground leveling work by referring to FIG. 13.

In a state where the bulldozer 2 moves, it can be considered that the bulldozer 2 tilts to the front, rear, left and right sides. FIG. 13 shows a state where the bulldozer 2 moves from a point A to a point B and the bulldozer 2 tilts at the point B in such a manner that the bulldozer 2 falls frontward. In FIG. 13, a reference numeral 85a denotes a scanning locus at the point A, and a reference numeral 85b denotes a scanning locus at the point B.

A scan is performed at each of the point A and the point B, and point cloud data along each scan is acquired respectively.

Since the attitude detecting unit 17 is capable of detecting a tilt angle in a wide range and also has a high responsiveness, the attitude detecting unit 17 is capable of rapidly and accurately detecting the tilt angles of the reference optical axis O at the points A and B respectively.

The horizontal distances are obtained based on the tilt angles and the direction angles of the reference optical axis O and the slope distances L, and the coordinate positions with reference to the points A and B are calculated.

In the present embodiment, the circular scan which is a two-dimensional closed loop is performed, and the two scanning loci 85a and 85b are overlapped with each other and also cross each other at two points a and b.

Pixels positioned at two intersections have the positional information as measured at the point A and the positional information as measured at the point B.

A horizontal distance measured at the point A must be different from a horizontal distance measured at the point B, and a difference between both the horizontal distances is equal to a moving amount M. Therefore, a moving amount of the bulldozer 2 can be recognized, and a result of performing the measurement at the point B can be converted into a reference coordinate system based on the moving amount.

Further, in a case where a height at the point A and a height at the point B, which are measured with respect to the pixels of the two intersections a and b, are different from each other, since the two points of intersection a and b have the same height, a difference in height is nothing else but a change in height of the bulldozer 2.

When the scan is performed for each image frame and the height measurement is executed with respect to the pixels at the two intersections a and b, a change in height of a traveling surface of the bulldozer 2 after the ground leveling can be recognized. Further, when a tilt measurement result of the attitude detecting unit 17 is recorded in correspondence with the movement of the bulldozer 2, a flatness, undulation and a state of tilt can be determined.

Thus, in the present embodiment, a measurement can be performed with respect to the ground surface 4 before the ground leveling, and also a state of the ground surface 4 after the ground leveling can be recognized.

Figure 15C:
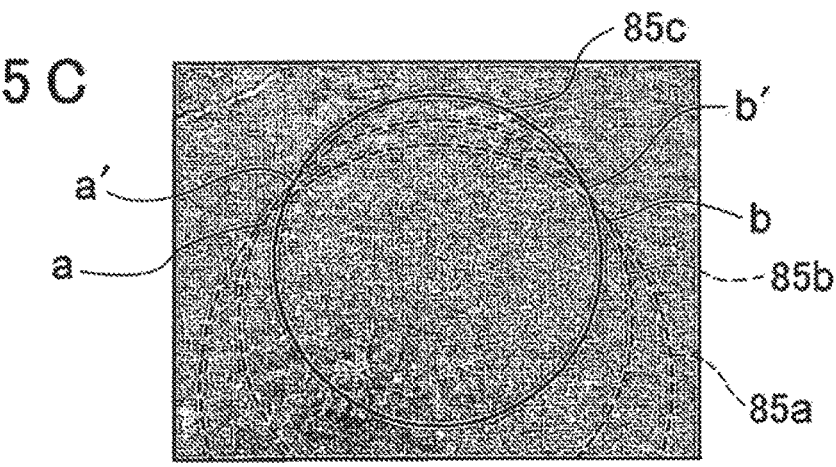
FIG. 15A, FIG. 15B and FIG. 15C are images as acquired by the surveying system.

Next, a description will be given on a height measurement of the ground surface 4 and a display of a measurement result by referring to FIG. 14 and FIG. 15.

(Step 01) Informations required for a measurement, e.g., a measurement start command and measurement conditions or the like are input from the first communication unit 18, and the measurement start command is input.

The measurement start command is issued from the display device 6 to the measuring instrument 5, and a measurement is started.

An acquisition of continuous images by the image pickup unit 14 is started, and scan data (i.e. distance measurement data, a scan direction angle, a distance measurement timing) and tilt angle data provided by the attitude detecting unit 17 are acquired in synchronization with an acquisition of a frame image. Here, the scan data and the tilt angle data are acquired for each light pulse.

(Step 02) A pixel, which coincides with a scan direction angle at a distance measurement timing for each light pulse, is associated with the distance measurement data at this moment and the tilt angle data of the attitude detecting unit 17. Further, all the pixels, which exist on a scanning locus, are associated with the distance measurement data and the tilt angle data.

(Step 03) A scanning position of the pixel associated on the scanning locus is calculated by the reference coordinate system. That is to say, the scanning position of the pixel is specified in the X axis and Y axis coordinate systems within the reference horizontal plane SR.

(Step 04) While repeating Step 01 to Step 03, the frame images which are adjacent to each other in terms of time are sequentially combined in the time series. Since the closed loop scan is executed for each frame image, one scanning locus 85a is obtained for one frame image (see FIG. 15A).

Figure 15B:
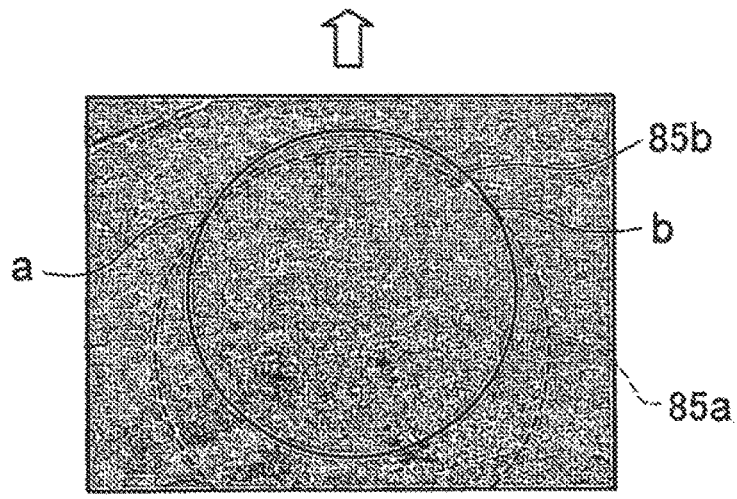
Figure 15A:
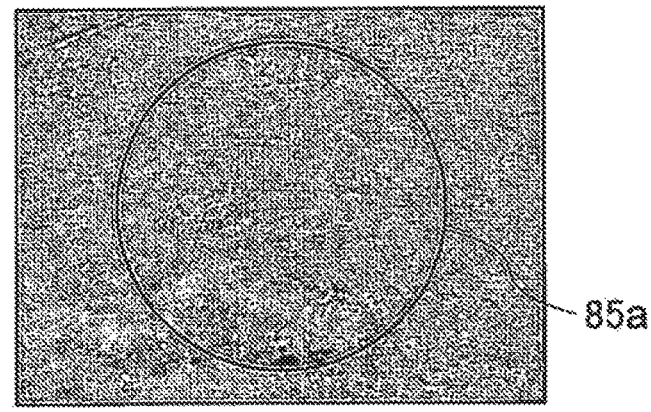

When combining the frame images, pixels on a scanning locus (hereinafter, a first scanning locus 85a) of a previous frame image (hereinafter, a first frame image) are specified in a subsequent frame image (hereinafter, a second frame image) by an image tracking (see Japanese Patent Application Publication No. 2007-171048), and the first scanning locus 85a is superimposed on the second frame image (FIG. 15B). Therefore, in the second frame image, the first scanning locus 85a and the second scanning locus 85b are obtained.

Further, all the pixels on the first scanning locus 85a are associated with scan data and tilt angle data, and the data as associated are taken over to the corresponding pixels in the second frame image when the first frame image is combined with the second frame image.

Since each of the first scanning locus 85a and the second scanning locus 85b forms a closed loop (a circular loop in the drawing), points of intersections a and b are generated on the first scanning locus 85a and the second scanning locus 85b.

The first scanning locus 85a and the second scanning locus 85b have distance measurement data respectively. Therefore, the points of intersections a and b have two distance measurement data respectively, and a difference between the each two distance measurement data arises from a movement of the bulldozer 2.

A deviation in the X and Y coordinates between the points of intersections a and b indicates the movement of the bulldozer 2, and a deviation in the Z coordinates indicates a deviation of a height. Further, since the heights of the points of intersections a and b do not change even if a measurement position varies, the deviation of the height in the Z coordinates corresponds to a height displacement of a contact surface of the bulldozer 2.

The measurement is sequentially repeated, and the scanning loci 85a, 85b, 85c, . . . whose number is equal to the number of combinations are obtained in a superimposed image (see FIG. 15B and FIG. 15C).

It is to be noted that the diameters of the first scanning locus 85a and the second scanning locus 85b are larger in FIG. 15B and FIG. 15C since by the bulldozer 2 moving, the measuring instrument 5 approaches the scanning loci 85a and 85b as obtained in advance and hence the loci as obtained the earlier seem the larger.

(Step 05) An operator selects a display mode which is easily viewable.

(Step 06) When a horizontal reference photography image mode is selected, an X axis of a horizontal plane is obtained based on a detection result of the attitude detecting unit 17, and the X axis as obtained is rotated so as to coincide with the X' axis of the display unit 77 (a display screen) and is displayed. When the X axis of the horizontal plane is set as the X' axis of the display screen, an accordance with the operator's sense is achieved, and a visibility is improved.

Figure 16A:
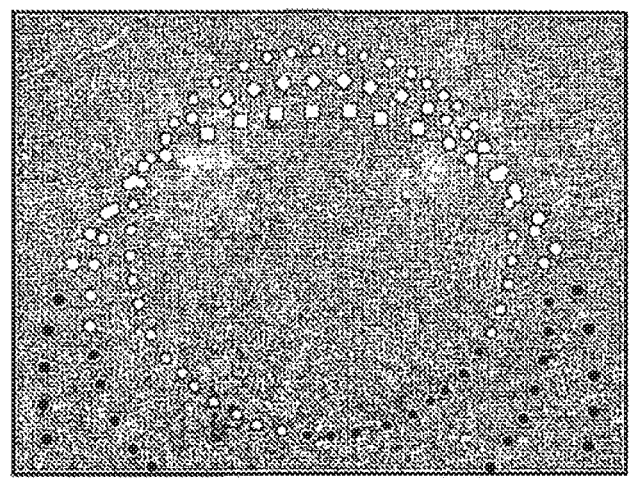
FIG. 16A is a drawing in which an information of a height is identified by a symbol and displayed on an image as acquired by the surveying system.

With respect to the display of a height of a measuring point, the measuring point may be represented by a dot, and a degree of height may be displayed using color. For example, in a case where a height is higher than the reference horizontal plane SR, the height may be displayed in a warm color, and in a case where a height is lower than the reference horizontal plane SR, the dot may be displayed in a cold color or the like, or each degree of height may be displayed using a shape and a color of the dot. For example, as shown in FIG. 16A, with respect to the heights, a black square<a black rhombus<a black circle<a white circle<a white rhombus<a white square (■<♦<●<○<◇<□) are adopted, or the like.

Figure 16B:
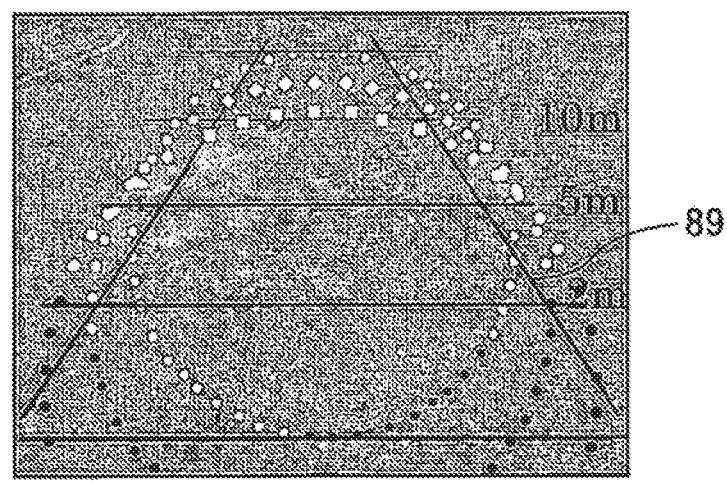
FIG. 16B is a drawing in which an auxiliary representation is superimposed.

Further, in order to facilitate a recognition of a condition of the ground surface 4, an auxiliary line 89 may be displayed. For example, as shown in FIG. 16B, in order to facilitate a recognition of a perspective (a depth), the lines are displayed at an interval as required, and a horizontal distance (m) to each line is displayed, or the like. It is to be noted that an auxiliary representation for facilitating the recognition is not restricted to the dot, the auxiliary line, a contour line, and others and includes various representations, e.g., the display in which construction data is superimposed, or the elimination of a range where a height of the auxiliary line is lower than the ground surface (the hidden line processing), or the like as a matter of course.

(Step 07) When an orthogonal projection image mode is selected, an image as acquired is converted into an ortho-image which directly faces a horizontal plane by a projective transformation based on a detection result of the attitude detecting unit 17 and is displayed. By converting into the ortho-image, the image becomes an image seen from directly above and it is possible to see the image with the same feeling as seeing a map. In this case, a contour line may be used for displaying a height.

Although the above description explains as to the case where a heavy machine moves, in a case where the heavy machine performs an operation without moving, e.g., in a case where a power shovel digs a hole or the like, it is important to monitor and measure a change in the ground surface rather than a moving speed of the power shovel itself.

As described above, by controlling the rotations of the optical prism 36a and the optical prism 36b, it is possible to obtain a scan of an arbitrary pattern.

A description will be given by referring to FIG. 17A and FIG. 17B.

Figure 17A:
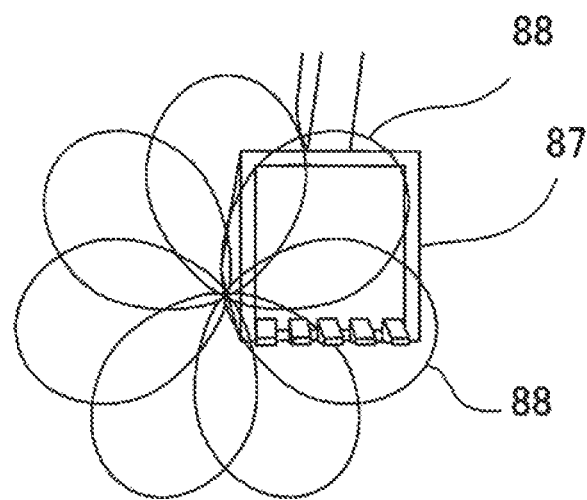
FIG. 17A and FIG. 17B are drawings showing an example of a closed scan when a measuring instrument does not move in the surveying system.

FIG. 17A shows an example where a series of closed loop scans 88 is executed toward a position (an excavating position) of a shovel 87, in which the optical prisms 36a and 36b are rotated at a constant speed at a predetermined ratio of rotating speeds so as to form a pattern like a floral pattern.

Figure 17B:
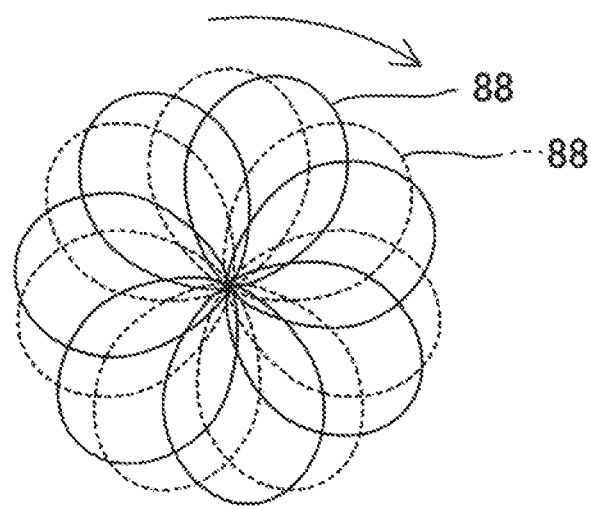

FIG. 17B shows a case where the scanning positions of the series of closed loop scans like a floral pattern are sequentially rotated (shifted) for each cycle, and a scan density is improved when a scan line shifts at a predetermined angle.

Further, it is needless to say that by controlling the rotating speed ratio and the rotating directions of the optical prisms 36a and 36b, it is possible to execute the scans in various modes.

It is to be noted that in the above description, a description has been given on the case where one closed loop scan is executed for one frame image, but it may be so arranged that one closed loop scan is divided into a plurality of frame images by synchronizing the acquisition of a frame image and the scan timing. In this case, the scan can be performed at a low speed, and a scan speed can be a speed adequate to a speed of the heavy machine or an operation speed.

In the present embodiment, although by the measurement using the measuring instrument 5, it is possible to obtain a measurement result with high accuracy in this measurement, there is a possibility that errors are cumulated. Therefore, in order to eliminate the cumulative errors, the surveying system may include a GPS device.

An accuracy of a position measurement using the GPS device is greater than a measurement error made by the measuring instrument 5, but the errors are not cumulated in all the measurement values. Therefore, by associating the position measurement results (a position on a horizontal plane, a height position) of the GPS device with the measurement result of the measuring instrument 5 for each light pulse measurement, it is possible to correct the cumulative errors in a case where the cumulative errors are occurred by the measuring instrument 5.

It is to be noted that the above embodiment is configured so as to measure a condition of the ground surface of a front side, but the measurement can be similarly performed by setting a direction of the measuring instrument on a lateral side or a rear side. Further, it may be so arranged that a plurality of measuring instruments are provided, and a front side, a lateral side, or the like are measured at the same time.

The invention claimed is:

1. A measuring instrument comprising: an image pickup unit for acquiring an image of a range including an object to be measured, a distance measuring unit for two-dimensionally scanning a predetermined range in synchronization with an image acquisition and for measuring, an arithmetic control unit and an attitude detecting unit for detecting a tilt angle of said image pickup unit with respect to a horizontality, wherein said arithmetic control unit associates a measurement result and a detection result of said attitude detecting unit with each pixel on a scanning locus corresponding to an acquired image.

2. The measuring instrument according to claim 1, wherein said two-dimensional scan is a closed loop.

3. A surveying system comprising: a measuring instrument according to claim 2 provided on a moving body, a display device having a display unit, wherein a reference optical axis of said measuring instrument is provided tilting with respect to a horizontal plane at a predetermined angle and directed in a predetermined direction with respect to an advancing direction of said moving body, said attitude detecting unit detects a tilt angle of said reference optical axis, wherein said arithmetic control unit is configured to synthesize a measurement result provided by said distance measuring unit with an image acquired by said image pick up unit and to display on said display unit.

4. The surveying system according to claim 3, wherein said image pickup unit is configured to acquire continuous images, said distance measuring unit is configured to two-dimensionally scan a predetermined range in synchronization with a frame image constituting said continuous images, and said arithmetic control unit is configured to combine said frame images in time series.

5. The surveying system according to claim 4, wherein said arithmetic control unit is configured to calculate a moving distance and a change in height according to a movement of said moving body based on a scan information of a pixel at a point where said scanning loci cross each other in a combined image acquired by combining said frame images.

6. The surveying system according to claim 3, wherein said attitude detecting unit comprises a tilt sensor and an acceleration sensor as tilt sensors, and an output from said attitude detecting unit is a detection result from said acceleration sensor corrected based on comparison data of said tilt sensor and said acceleration sensor.

7. The surveying system according to claim 3, wherein an auxiliary representation, which facilitates a recognition of a condition of a ground surface, is superimposed on an image and displayed.

8. The measuring instrument according to claim 1, wherein a pixel coordinate is converted into a vertical reference coordinate based on a tilt angle information detected by said attitude detecting unit, and a horizontal distance and a height information are calculated based on a scan information of pixel corresponding to said scanning locus and are added to said pixel.

9. The measuring instrument according to claim 8, wherein an image acquired is converted into an ortho-image of a horizontal plane based on said tilt angle information included in said scan information.

10. A surveying system comprising: a measuring instrument according to claim 9 provided on a moving body, a display device having a display unit, wherein a reference optical axis of said measuring instrument is provided tilting with respect to a horizontal plane at a predetermined angle and directed in a predetermined direction with respect to an advancing direction of said moving body, said attitude detecting unit detects a tilt angle of said reference optical axis, wherein said arithmetic control unit is configured to synthesize a measurement result provided by said distance measuring unit with an image acquired by said image pick up unit and to display on said display unit.

11. The surveying system according to claim 10, wherein said image pickup unit is configured to acquire continuous images, said distance measuring unit is configured to two-dimensionally scan a predetermined range in synchronization with a frame image constituting said continuous images, and said arithmetic control unit is configured to combine said frame images in time series.

12. The surveying system according to claim 11, wherein said arithmetic control unit is configured to calculate a moving distance and a change in height according to a movement of said moving body based on a scan information of a pixel at a point where said scanning loci cross each other in a combined image acquired by combining said frame images.

13. The surveying system according to claim 10, wherein said attitude detecting unit comprises a tilt sensor and an acceleration sensor as tilt sensors, and an output from said attitude detecting unit is a detection result from said acceleration sensor corrected based on comparison data of said tilt sensor and said acceleration sensor.

14. The surveying system according to claim 10, wherein an auxiliary representation, which facilitates a recognition of a condition of a ground surface, is superimposed on an image and displayed.

15. A surveying system comprising: a measuring instrument according to claim 8 provided on a moving body, a display device having a display unit, wherein a reference optical axis of said measuring instrument is provided tilting with respect to a horizontal plane at a predetermined angle and directed in a predetermined direction with respect to an advancing direction of said moving body, said attitude detecting unit detects a tilt angle of said reference optical axis, wherein said arithmetic control unit is configured to synthesize a measurement result provided by said distance measuring unit with an image acquired by said image pick up unit and to display on said display unit.

16. The surveying system according to claim 15, wherein said image pickup unit is configured to acquire continuous images, said distance measuring unit is configured to two-dimensionally scan a predetermined range in synchronization with a frame image constituting said continuous images, and said arithmetic control unit is configured to combine said frame images in time series.

17. The surveying system according to claim 16, wherein said arithmetic control unit is configured to calculate a moving distance and a change in height according to a movement of said moving body based on a scan information of a pixel at a point where said scanning loci cross each other in a combined image acquired by combining said frame images.

18. The surveying system according to claim 15, wherein said attitude detecting unit comprises a tilt sensor and an acceleration sensor as tilt sensors, and an output from said attitude detecting unit is a detection result from said acceleration sensor corrected based on comparison data of said tilt sensor and said acceleration sensor.

19. The surveying system according to claim 15, wherein an auxiliary representation, which facilitates a recognition of a condition of a ground surface, is superimposed on an image and displayed.

20. The measuring instrument according to claim 1, wherein said attitude detecting unit comprises a tilt sensor and an acceleration sensor as tilt sensors, and an output from said attitude detecting unit is a detection result from said acceleration sensor corrected based on comparison data of said tilt sensor and said acceleration sensor.

21. A surveying system comprising: a measuring instrument according to claim 1 provided on a moving body, a display device having a display unit, wherein a reference optical axis of said measuring instrument is provided tilting with respect to a horizontal plane at a predetermined angle and directed in a predetermined direction with respect to an advancing direction of said moving body, said attitude detecting unit detects a tilt angle of said reference optical axis, wherein said arithmetic control unit is configured to synthesize a measurement result provided by said distance measuring unit with an image acquired by said image pick up unit and to display on said display unit.

22. The surveying system according to claim 21, wherein said image pickup unit is configured to acquire continuous images, said distance measuring unit is configured to two-dimensionally scan a predetermined range in synchronization with a frame image constituting said continuous images, and said arithmetic control unit is configured to combine said frame images in time series.

23. The surveying system according to claim 22, wherein said arithmetic control unit is configured to calculate a moving distance and a change in height according to a movement of said moving body based on a scan information of a pixel at a point where said scanning loci cross each other in a combined image acquired by combining said frame images.

24. The surveying system according to claim 21, wherein said attitude detecting unit comprises a tilt sensor and an acceleration sensor as tilt sensors, and an output from said attitude detecting unit is a detection result from said acceleration sensor corrected based on comparison data of said tilt sensor and said acceleration sensor.

25. The surveying system according to claim 21, wherein an auxiliary representation, which facilitates a recognition of a condition of a ground surface, is superimposed on an image and displayed.

* * * * *